United States Patent [19]
Wada et al.

[11] 4,402,018
[45] Aug. 30, 1983

[54] SYSTEM USING A ROTATING MEDIUM FOR RECORDING CINEMATOGRAPHIC PICTURE IMAGES

[75] Inventors: Yoshiyo Wada; Hisao Kinjo, both of Yokohama; Keiji Ozawa, Yamato; Kazuo Tatsuguchi; Kunio Goto, both of Yokohama; Atsumi Hirata, Yamato, all of Japan

[73] Assignee: Victor Company of Japan, Ltd., Yokohama, Japan

[21] Appl. No.: 270,592

[22] Filed: Jun. 4, 1981

Related U.S. Application Data

[63] Continuation of Ser. No. 46,556, Jun. 7, 1979, abandoned.

[30] Foreign Application Priority Data

Jun. 9, 1978 [JP] Japan .................................. 53-69630

[51] Int. Cl.³ .............................................. H04N 5/76
[52] U.S. Cl. .................................... 358/342; 358/346
[58] Field of Search ................. 360/10, 11, 10.1, 10.2; 358/128.5, 128.6, 244, 312, 342, 346, 347, 348, 244.1, 244.2

[56] References Cited

U.S. PATENT DOCUMENTS

| | | | |
|---|---|---|---|
| 3,366,733 | 1/1968 | Frohback | 358/128.6 |
| 3,796,825 | 3/1974 | Redlich et al. | 358/128.5 |
| 3,973,080 | 8/1976 | Dickopp et al. | 358/128.5 |
| 3,977,021 | 8/1976 | Kobayashi et al. | 358/128.5 |
| 4,015,285 | 3/1977 | Romeas | 358/128.5 |
| 4,064,538 | 12/1977 | Broussaud | 358/128.6 |
| 4,090,218 | 5/1978 | van Buul et al. | 360/10 X |
| 4,142,209 | 2/1979 | Hedlund et al. | 358/128.5 |

FOREIGN PATENT DOCUMENTS

| | | | |
|---|---|---|---|
| 2809490 | 9/1978 | Fed. Rep. of Germany | 358/128.6 |
| 2376486 | 9/1978 | France | 360/10 |

*Primary Examiner*—Bernard Konick
*Assistant Examiner*—Donald McElheny, Jr.
*Attorney, Agent, or Firm*—Louis Bernat

[57] ABSTRACT

A recording system records a television video signal of 60 fields per second converted from a signal of the picture image content of a cinematographic film for projection at 24 film frames per second, in a manner such that the video signal has parts in each of which the picture image content of one and the same film frame continues during at least 4 fields thereof, along a spiral track on a rotating recording medium rotating at a rotational speed of 900 revolutions per second at a recording rate of 4 fields per revolution of the recording medium. The rotating recording medium thus recorded has a part on which the picture image content of one and the same film frame is recorded over a part of a length of the track corresponding to at least one revolution of the recording medium.

3 Claims, 10 Drawing Figures

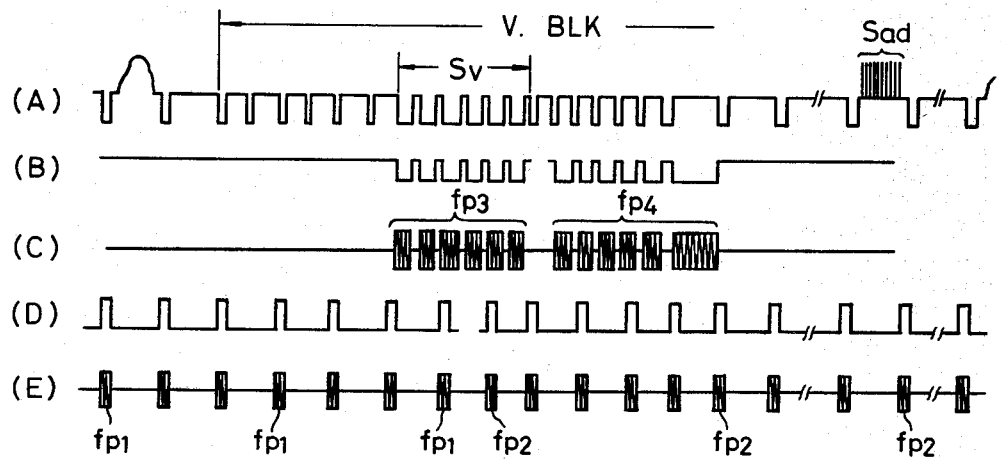
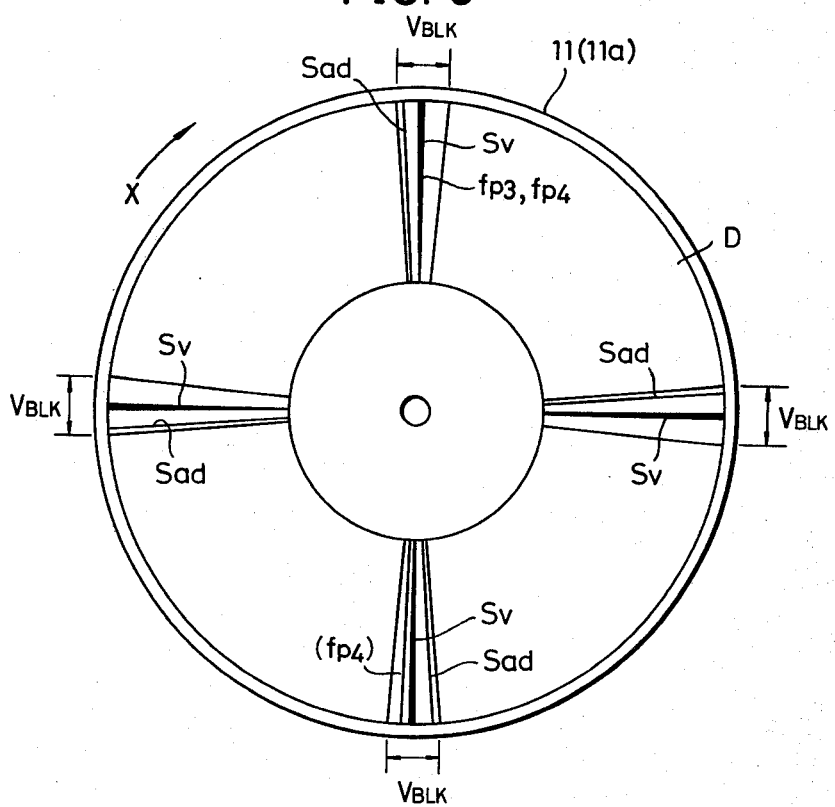

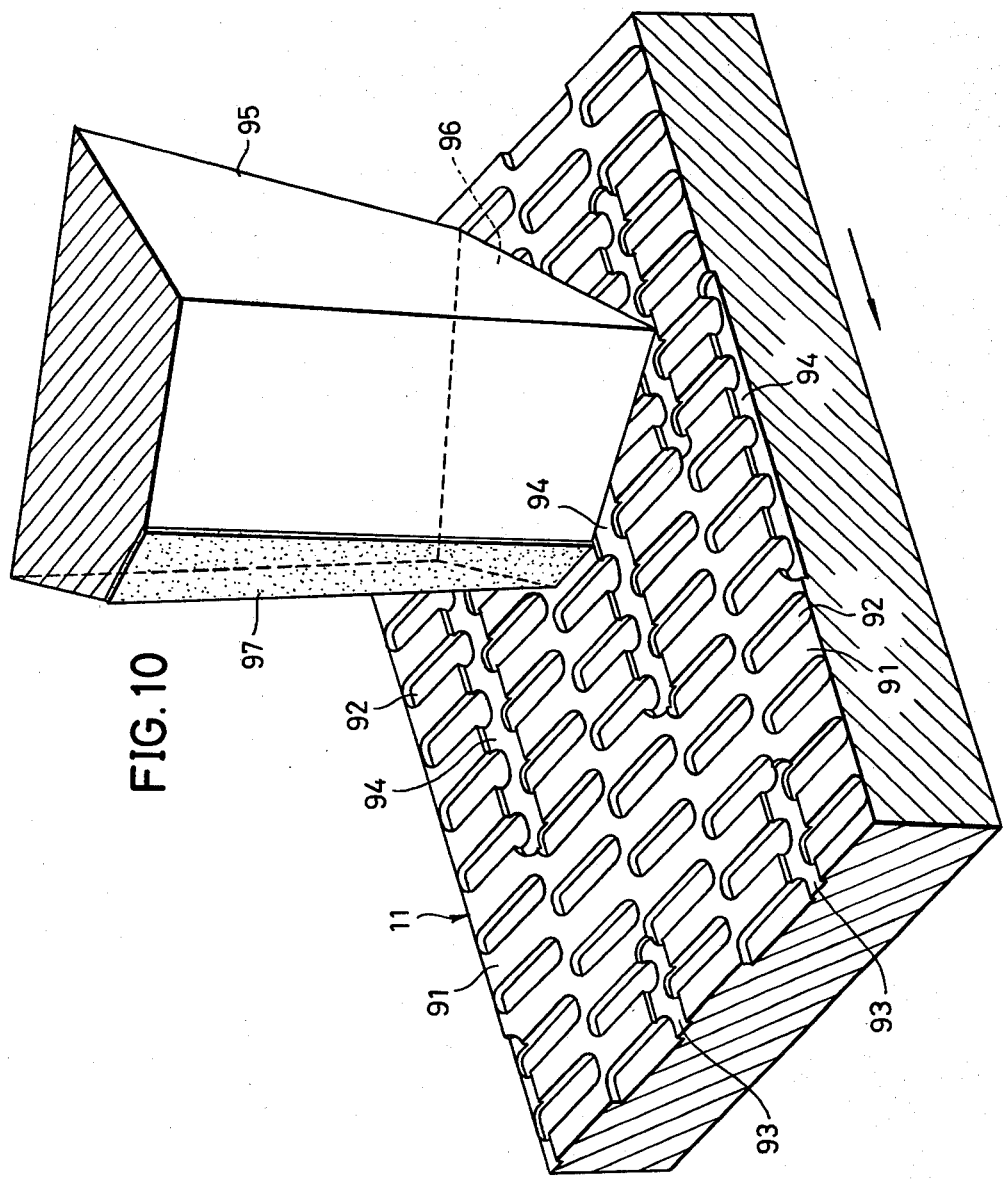

SYSTEM USING A ROTATING MEDIUM FOR RECORDING CINEMATOGRAPHIC PICTURE IMAGES

This is a continuation of application Ser. No. 46,556, filed June 7, 1979, now abandoned.

BACKGROUND OF THE INVENTION

The present invention relates generally to systems for recording the picture image content of a cinematographic film in a form of a video signal on a rotating recording medium and for subsequently reproducing therefrom the video signal. More particularly, the invention relates to a system which records the picture content of a cinematographic film traveling at a speed of 24 film frames or scenes per second in a form of a television video signal of 60 fields (namely, 30 frames) per second on a rotating recording medium rotating at a speed of 900 revolutions per second in a manner such that still picture reproduction can also be carried out, and which subsequently reproduces the video signal thus recorded from the recording medium.

In general, in a system for recording a television video single on a rotating recording medium, the fewer the field of the video signal to be recorded per revolution of the rotating recording medium, the higher is the rotational speed at which the rotating recording medium must be rotated. In this case, the system is subjected, mechanically, to unreasonably and excessively severe conditions, whereby vibration occurs, or automatic control becomes difficult. Moreover, the recording capacity of the recording medium is reduced.

On the other hand, the greater the number of fields of the video signal to be recorded per revolution of the rotating recording medium, the lower is the required rotational speed of the rotating recording medium. For this reason, the system is not subjected mechanically to excessively severe conditions, and furthermore, the recording capacity of the recording medium becomes large. On the other hand, however, since the wavelength of recording on the recording medium becomes short, in the case where the signal is recorded on the recording medium as a variation of geometrical shape and is thereafter reproduced as capacitance variation or optical variation, the reproducing element becomes unable to reproduce satisfactorily.

In this connection, a novel "Information signal recording and reproducing system" assigned to the same assignee of the present application was proposed by U.S. patent application Ser. No. 785,095, filed Apr. 6, 1977, now U.S. Pat. No. 4,331,976, and is now being reduced to practice. In accordance with this system, a video signal is recorded along a track of spiral form as a geometrical shape variation, without a reproducing stylus guide groove, on a rotating recording medium having a flat surface. Since there is no guide groove in the rotating recording medium, the reproducing stylus can move smoothly from one track turn to another at the time of still-picture, slow-motion, or quick-motion reproduction. Accordingly, in spite of the use of a reproducing stylus in this system, special reproducing modes such as the still-picture reproduction can be smoothly carried out.

However, in the case where still-picture reproduction is carried out by repeatedly reproducing the same track turn, if an information content signal of a larger number of fields is recorded along the same track turn, the reproduced still picture will not be one which is perfectly still but will appear unnatural and unsightly or indistinct. More specifically, particularly in the case where the information content is one of rapid motion, the position of each moving object at the starting point of the same track turn differs from that at the terminal point of the same track turn in the reproduced picture. For this reason, when the same track turn is repeatedly reproduced, each moving object repeatedly undergoes reciprocation been these two different positions, and the reproduced image appears to flicker or vibrate. Also at the time of slow-motion reproduction when the same track turn is reproduced a plurality of times and then the reproducing element (stylus) shifts to the succeeding track turn, the reproduced picture will move unnaturally.

In view of the various above described circumstances, we have decided that it is most desirable to record a video signal at a rate of four fields, that is, two frames, per revolution of the rotating recording medium.

The procedure of converting the picture image content of a cinematographic film of 24 film frames per second into a video signal of 60 fields (30 frames) per second and using this video signal for either television broadcasting or recording on a recording medium such as a magnetic tape has been practiced in the prior art. For this conversion of the picture of 24 film frames per second into a video signal of 60 fields per second, in general, a so-called 3-2 pull-down method is being used. This 3-2 pull-down method is carried out by controlling the cinematographic film feed and the shutter operation of the projector so that the first film frame is transcribed for 3 fields, the second film frame for 2 fields, the third film frame for 3 fields, the fourth film frame for 2 fields, the succeeding film frames similarly being transcribed alternately for 3 fields and 2 fields. The light image thus projected by this projector is picked up by a camera tube and thereby converted into a television video signal.

However, when the video signal converted by this 3-2 pull-down method is recorded directly as it is on a rotating recording medium at the above described rate of 4 fields per revolution (corresponding to one track turn), the information of the first film frame of 3 fields and the information of the second film frame of 1 field are recorded along the first track turn; the information of the remaining fields of the second film frame and the information of 3 fields of the third film frame are recorded along the second track turn; and so forth. In this manner, the information of a plurality of film frames are recorded over and with respect to all track turns.

For this reason, in the case of obtaining a still picture by reproducing only the same track turn a plurality of times, the information of two different film frames are repeatedly reproduced. Consequently, in the case where the movements of the image of the information contents are rapid, the resulting still picture flickers and becomes indistinct.

SUMMARY OF THE INVENTION

Accordingly, it is a general object of the present invention to provide a novel and useful system for recording the picture content signal of a cinematographic film as a video signal on a rotating recording medium and for subsequently reproducing the video signal thus recorded, in which system the above described difficulties encountered heretofore have been overcome.

Another and specific object of the invention is to provide a system for converting the picture content of a cinematographic film projected at 24 film frames per second in a manner such that a part (wherein the picture image content of the same film frame exists during the period of 4 fields) exists for a specific period, thereby recording the converted content on a rotating recording medium, and for subsequently reproducing the content thus recorded. By this provision of the system of the invention, at the time of still-picture reproduction, a still picture which is perfectly still is obtained by repeatedly reproducing the track turn along which the picture content of the above mentioned same film frame is recorded.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIGS. 7(A) through 7(E) are waveform charts respectively indicating the waveforms of signals recorded by the system shown in FIG. 5;

FIG. 8 is a diagrammatic plan view for a description of the recorded positions of signals on a rotating recording medium on which the signals are recorded by the system illustrated in FIG. 5;

FIG. 10 is a greatly enlarged perspective view showing the relationship between a reproducing stylus and a part of a track of a rotating recording medium.

DETAILED DESCRIPTION

Figure 1:
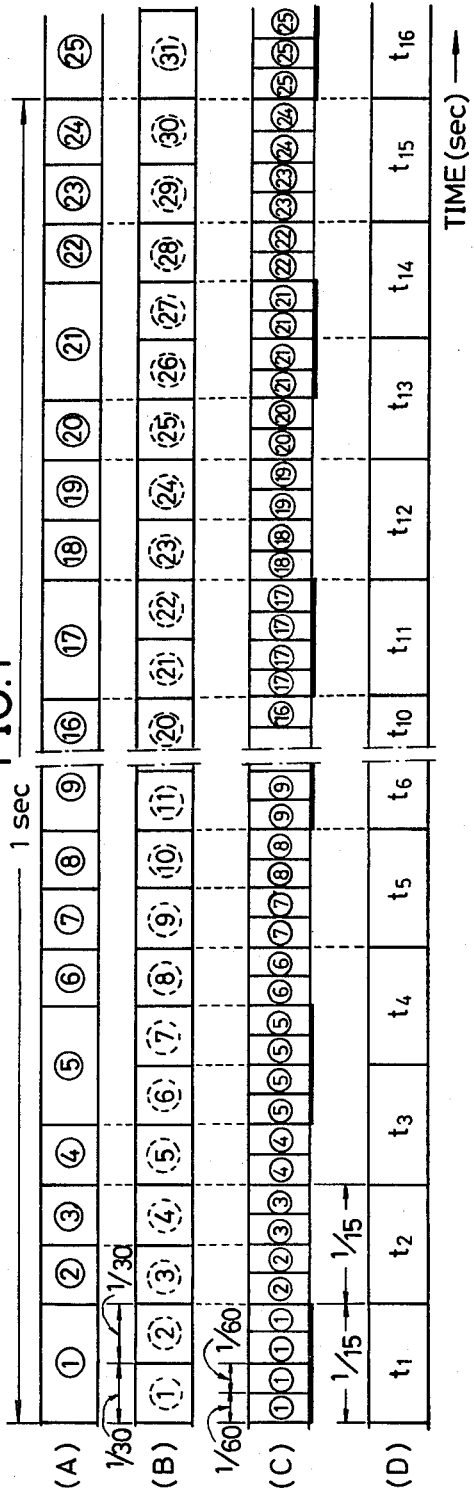
FIGS. 1(A) through 1(D) are time charts respectively for a description of a first embodiment of the system according to the invention for converting the picture content of a cinematographic film projected at 24 film frames per second into a television video signal of 60 fields per second.

In general, a cinematographic film comprises photograhic pictures in film frames which are to be projected at a rate of 24 film frames per second. In accordance with the first embodiment of the system of the present invention, the film feeding (pulling-down) mechanism of a cinematographic film projector is set beforehand so that a picture image signal is obtained during 1/15 second with respect to the first film frame, during 1/30 second with respect to each of the second, third, and fourth film frames, during 1/15 second with respect to the fifth film frame, during 1/30 second with respect to each of the sixth, seventh, and eighth film frame, and so forth. By this setting, a pulled down frame picture signal is obtained as indicated in FIG. 1(A). In FIG. 1(A), the numerals shown enclosed by circles represent film frame numbers of the cinematographic film.

When these film frame numbers correspond to the frames of a television video signal of 30 frames per second, the relationship as indicated by FIGS. 1(A) and 1(B) is obtained. In FIG. 1(B), the numerals shown enclosed by broken-line circles represent frame numbers of the video signal. As is apparent from a comparison of the time charts of FIGS. 1(A) and 1(B): the picture signal of the first film frame corresponds to the first and second video frames; that of the second, third, and fourth film frames to the third, fourth, and fifth video frames; that of the fifth film frame to the sixth and seventh video frames; that of the sixth, seventh, and eighth film frames to the eighth, ninth, and tenth video frames; and so forth thereafter.

Figure 3:
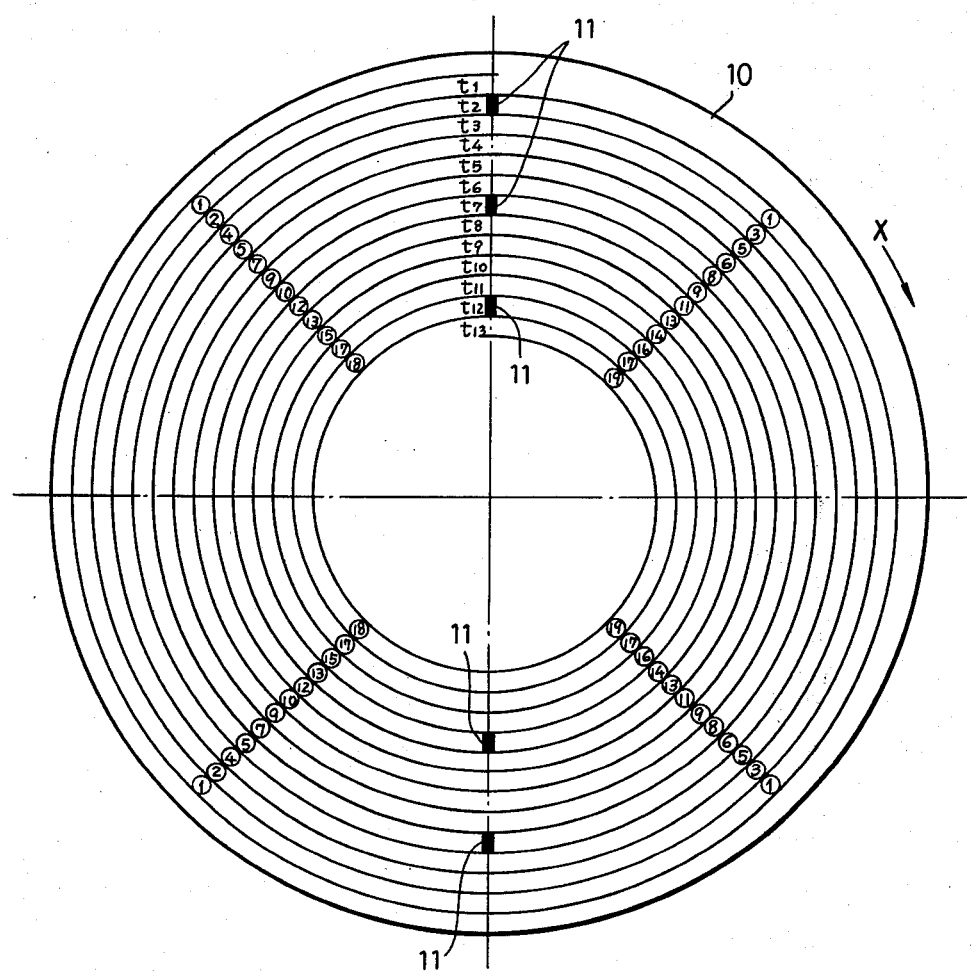
FIG. 3 is a plan view showing in outline form the track pattern of a rotating recording medium on which a video signal converted by the conversion system indicated in FIGS. 1(A) through 1(D) has been recorded.

When this film frame picture signal correspond to the fields of the video signal, the relationship indicated in FIG. 1(C) is obtained. In FIG. 1(C), one divisional unit represents a field of 1/16-second period, and the numerals enclosed by circles represent the film frame numbers corresponding to the above mentioned picture content. As is apparent from FIG. 1(C), the picture contents of the successive first, second, third, fourth film frames as a unit are converted respectively into 4 fields, 2 fields 2 fields, 2 fields of the video signal. Hereinafter this signal will be referred to as a video signal having a picture information content converted by 4-2-2-2 pull-down The converted video signal shown in FIG. 1(C) obtained in this manner, is recorded at a rate of 4 fields per track turn (per revolution) of a spiral track on a rotating recording disc 10 as shown in FIG. 3 rotating at 900 revolutions per minute by a recording system described hereinafter in conjunction with FIG. 5, for example. The successive numbers of the track turns of the spiral track corresponding to successive revolutions of the disc 10 are designated in FIGS. 3 and 1(D) as $t_1$, $t_2$, $t_3$, . . . . As is apparent from this: the video signal of the picture content of the first film frame of 4 fields is recorded along the first track turn $t_1$; the video signal of the picture content of the second and third film frames each of 2 fields is recorded along the second track turn $t_2$; the video signal of the picture content of the fourth and fifth film frames each of 2 fields is recorded along the third track turn $t_3$; and the video signal of the picture content of the fifth and sixth film frames each of 2 fields is recorded along the fourth track turn $t_4$. In this manner, the picture contents of 24 film frames are recorded as a video signal of 30 frames along 15 track turns.

In general, still-picture reproduction of a signal recorded along a spiral track of a recording disc is accomplished by an operation wherein the recording stylus, upon completing the reproduction of one track turn, shifts track turns, again returning to the starting end of the same track turn, and repeats the reproducion of that same track turn. Accordingly, still-picture reproduction of the disc 10 recorded by the system of the present invention can be carried out by repeatedly reproducing the parts wherein, over the span of 4 fields, the picture content of the same film frame is continuously recorded, that is, in the above described embodiment of the invention the track parts of the first track turn, the trailing half of the third track turn and the leading half of the fourth track turn, the sixth track turn, the trailing half of the eighth track turn and the leading half of the ninth track turn, the eleventh track turn, or the trailing half of the thirteenth track turn and the leading half of the fourteenth track turn, and so forth. By this process, the picture content of the same film frame is repeatedly reproduced, and a reproduced picture which is perfectly still, without flickering, is obtained.

In this connection, the recording track parts of the first, fifth, ninth, thirteenth, seventeenth, or other film frames in the series in each of which the picture content of the same film frame is continuous in the period of 4 fields. The track parts can be selected and repeatedly reproduced adding beforehand reference signals for identification on the ends of these track parts or by providing a memory device and using it to store the addresses of these track parts, as described hereinafter. In the case where reference signals are used for identification, those reference signals are recorded at the positions designated by reference numeral 11 in FIG. 3.

Figure 2:
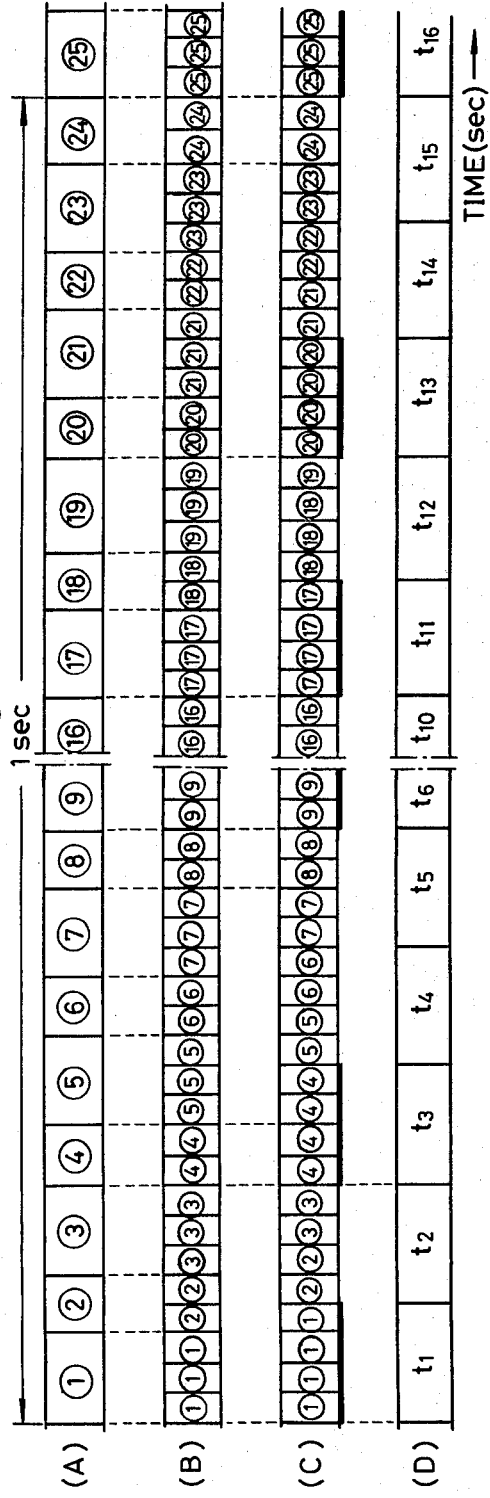
FIGS. 2(A) through 2(D) are time charts respectively for a similar description of a second embodiment of the conversion system according to the invention.

Another example of a pull-down method will now be described. As indicated in FIGS. 2(A) and 2(B), according to the known 2-3 (3-2) pull-down method, pull downs are so set that the first film frame is transcribed into 3 fields, the second film frame into 2 fields, the third film frame into 3 fields, the fourth film frame into 2 fields, and so on, and the picture contents of all frames of the cinematographic film are converted into a television video signal. The video signal of the time sequence indicated in FIG. 2(B) is once written into a memory device of an analog memory or a digital memory and is then read out in the time sequence indicated in FIG. 2(C).

This video signal, thus read out, comprises a time sequence wherein the picture content of the first film frame is converted into 4 fields, those of the second and third film frames are converted into 2 fields, each, that of the fourth film frame is converted into 4 fields, and those of the fifth, sixth, seventh, and eighth film frames are converted into 2 fields, each, these conversions being sequentially repeated thereafter. Therefore, in the present embodiment of the invention a video signal which has been subjected to 4-2-2-4-2-2-2-2 pull-down is obtained as an ultimate result.

Figure 4:
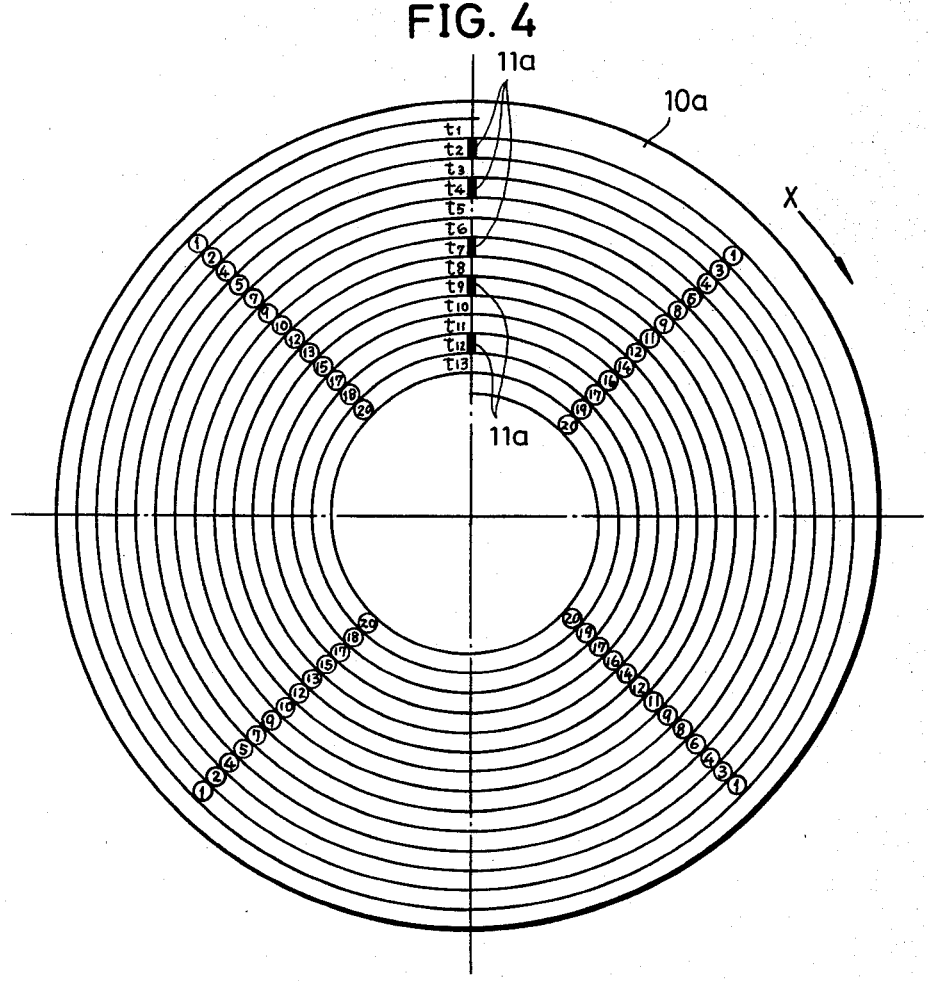
FIG. 4 is a similar plan view showing in outline form the track pattern of a rotating recording medium on which a video converted by the conversion system indicated in FIGS. 2(A) through 2(D) has been recorded.

When a video signal of a time sequence of this character is recorded on a recording medium 10a as shown in FIG. 4, each part in which the picture content of the same film frame continues over 4 fields is accommodated exactly within a respective one track turn, in all cases, as is apparent from a comparison of the video signal shown in FIG. 2(C) and the track turns shown in FIG. 2(D). Accordingly, reference signals for identification are recorded at the positions designated by reference numeral 11a in FIG. 4. In the present embodiment of the invention, the recorded positions 11a of the reference signals for identification are aligned along the same radial direction.

Still-picture reproduction of the disc 10a which has been recorded by the system of the present embodiment of the invention can be carried out by repeatedly reproducing the first, third, sixth, eighth, or eleventh track turn. As a result of this process, only a signal part of the picture content of the same film frame is repeatedly reproduced, and for this reason, a perfectly still, reproduced picture is obtained.

The pull-down mode is not limited to those of the above described embodiments of the invention but may be, for example, a 5-1-2-2 pull-down, a 4-1-3-2 'pull-down, or a 4-2-3-1 pull-down. The essential requirement is that the pull-down be carried out in a manner such that there exist parts wherein the picture content of one and the same film frame continues over at least 4 fields.

Next, one example of a recording system for recording a video signal obtained by conversion from the picture of a cinematographic film by the above described pull-down operation on a rotating disc will be described with reference to FIG. 5.

A laser light beam emitted from a laser light source 21 is reflected by a mirror 22 and passed through a light modulator 23 for light quantity adjustment. The light beam thus adjusted is projected onto a half mirror 24, which transmits one part of the light to a light modulator 25 and reflects another part thereof to another light modulator 26.

A video signal source 27 produces as output a video signal which is directly obtained through conversion of a pull-down method by means of a combination of the projector and the image-pickup device as described above, or reproduced from a magnetic tape on which the converted video signal has been recorded. The video signal from the video signal source 27 is supplied to a frequency modulator 28 to frequency modulate a carrier wave. The resulting output, frequency-modulated signal is added with the reference signal at the adder 29 as described hereinafter and is supplied as a main information signal to the above mentioned light modulator 25 to modulate the light beam transmitted through the half mirror 24. The frequency-modulated signal has a carrier wave center frequency of 7.0 MHz and has a frequency deviation width of 2.2 MHz. The resulting output is projected as a first modulated light beam onto a mirror 30, by which it is reflected, and is passed through a polarizing prism 31. The light thus transmitted through the prism 31 is reflected by a mirror 32, passes through an objective lens 33, and is brought to a focus on a photosensitive agent applied as a coating on a recording original disc 34 made of material such as glass.

On the other hand, a signal of 3.58 MHz (fsc) which is synchronized with a color subcarrier of the color video signal is applied to an input terminal 35. This signal is frequency divided by 1/5 and 1/7, for example, at frequency dividers 36 and 37, respectively, and thus converted respectively into reference signals for tracking control of a frequency fp1 (of 716 KHz) and a frequency fp2 (of 511 KHz). The signal from the terminal 35 is also frequency divided by 1/13 and 1/21, for example, at frequency dividers 38 and 39, respectively, and thus converted into pilot signals of a frequency fp3 (of 275 KHz) and a frequency fp4 (of 170 KHz). The output signals fp1, fp2, fp3, and fp4 of the dividers 36, 37, 38 and 39 are respectively supplied to gate circuits 40, 41, 42, and 43. The gate circuits 40 through 42 are respectively controlled of their gate operations responsive to gate signals supplied to terminals 44, 45, and 46, which gate signals are respectively illustrated in FIG. 7(D) on the left and right hands thereof and in FIG. 7(B) on the left hand thereof.

The signal fp1 is derived from the gate circuit 40 during each horizontal blanking interval in two frame interval every other two frame periods of the recording video signal. The signal fp2 is derived from the gate circuit 41 during each horizontal blanking interval in two frame interval every other two frame periods, during which two frame interval no signal is derived from the gate circuit 40. The output signals of the gate circuits 40 and 41 are supplied to the mixer 47 where they are mixed each other. From the mixer 47 are thus derived the first and second reference signals fp1 and fp2 which exist respectively during every horizontal blanking interval in the two frame interval alternately every other two frame periods.

A gate pulse which exists in the vertical blanking interval with two frame periods as indicated in FIG. 7(B) on the left hand thereof is applied to the gate circuit 42 from the terminal 46. This gate pulse exists in an interval corresponding to a specific position Sv in the vertical blanking period V. BLK as indicated in FIG. 7(A). Accordingly, the third reference signal fp3, which exists in the vertical blanking period and has two frame period as indicated in FIG. 7(C), is derived from the gate circuit 42 and supplied to the adder 29. The third reference signal fp3 is added, as a signal existing in the vertical blanking period every other two frame periods, to the frequency modulated video signal from the frequency modulator 28.

The reference signals fp1 and fp2 from the mixer 47 are supplied to the light modulator 26. The light beam reflected by the aforementioned half mirror 24 is modulated in the light modulator 26 by the above mentioned pilot signals, and the resulting output is reflected as a second modulated light beam by a mirror 48, thus being introduced into the polarizing prism 31, where its polarization plane is angularly shifted by 90 degrees from that of the above mentioned first modulated light beam. The second modulated light beam leaving the polarizing prism, together with the first modulated light beam, is reflected by the mirror 32, passes through the objective lens 33, and is focussed on the recording original disc 34.

The original disc 34, which is mounted on a turntable 49, is rotated at a rotational speed of 900 rpm. by a motor 50. The original disc 34, turntable 49, and motor 50 are unitarily and continuously transported at a specific pitch in the arrow direction X by a transporting mechanism (not shown). As a result, the aforementioned video signal and the pilot signals are recorded along a spiral track on the original disc from its outer periphery toward its central part respectively by the first and second modulated light beams.

Furthermore, a displacement position detector 51 comprising a potentiometer is provided to detect the displacement position due to the above described transporting movement as the original disc 34 and the turntable 49 are transported in the above mentioned arrow direction X and to produce as output a DC voltage responsive to the displacement position. This detected DC voltage is passed through a DC amplifier 52 and applied to the aforementioned light modulator 23 for light quantity adjustment thereby to control the intensity of the light beam from the laser light source 21 in responsive accordance with the position in the radial direction of the original disc 34 of the light beam spot focussed on the disc 34. By this arrangement and operation of the recording apparatus, compensation is provided so as to eliminate the effect of differences in relative linear speed due to the position of the light beam spot in the radial direction of the original disc 34.

On the other hand, the output signal from the video signal source 27 is also supplied to a gate pulse generator 53. In this case, a pulse signal has been added to this signal from the video signal source 27 at the starting end or the terminal end of the period in which one and the same film frame is projected during 4 fields interrelatedly to the operation of pulling down the film of the cinematographic projector. The gate pulse generator 53 discriminates this added pulse signal and, in response thereto, generates a gate pulse existing at the terminal end of the 4-field period of the above mentioned picture content of the same film frame and, moreover, existing at a specific position in the vertical blanking period V.BLK as indicated at the right side of FIG. 7(B). The gate pulse thus generated is fed to the gate circuit 43. In response to this gate pulse, the gate circuit 43 gates a reference signal fp4 from the frequency divider 39 and supplies the identification reference signal fp4 for still-picture reproduction as indicated in FIG. 7(C) to the adder 29. The position of the identification reference signal fp4 may be at the starting end or at both the starting end and the terminal end of the 4-field period of the picture content of the above mentioned same film frame.

The aforementioned gate signal supplied to the terminal 46 is fed also to an address signal generating circuit 54, and an address signal Sad as shown in FIG. 7(A) thus generated here is also fed to the adder 29.

Figure 6:
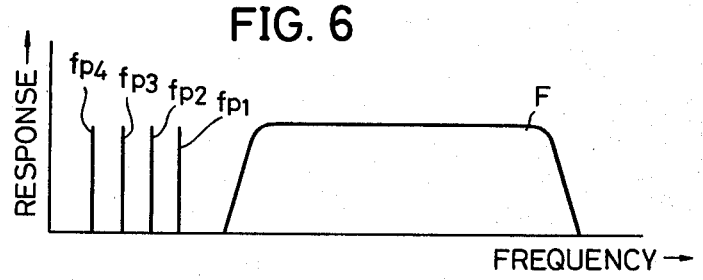
FIG. 6 is a frequency spectrum chart of the signals recorded by the system illustrated in FIG. 5.

A main information signal resulting from the addition of the reference signals fp3 and fp4 and the address signal Sad in the adder 29 is fed to the light modulator 25 as described hereinbefore and is recorded on the original disc 34. The frequency spectrums of the frequency-modulated video signal F and the reference signal fp1 through fp4 to be recorded on the original disc 34 are as shown in FIG. 6.

While, in the above described embodiment of the invention, the frequency divider 39 is used to obtain the frequency of the identification reference signal fp4, a signal of the same frequency as the reference signal fp3 may be inserted as the identification reference signal in the position of the identification reference signal fp4 shown in FIG. 7(C). In the reproducing system, this identification reference signal fp4 is gated by a gate pulse generated on the basis of the reproduced reference signal fp3 and picking up the identification reference signal fp4. In this case, the frequency divider 39 becomes unnecessary, and, in addition, the frequency-band utilization rate is improved.

Figure 5:
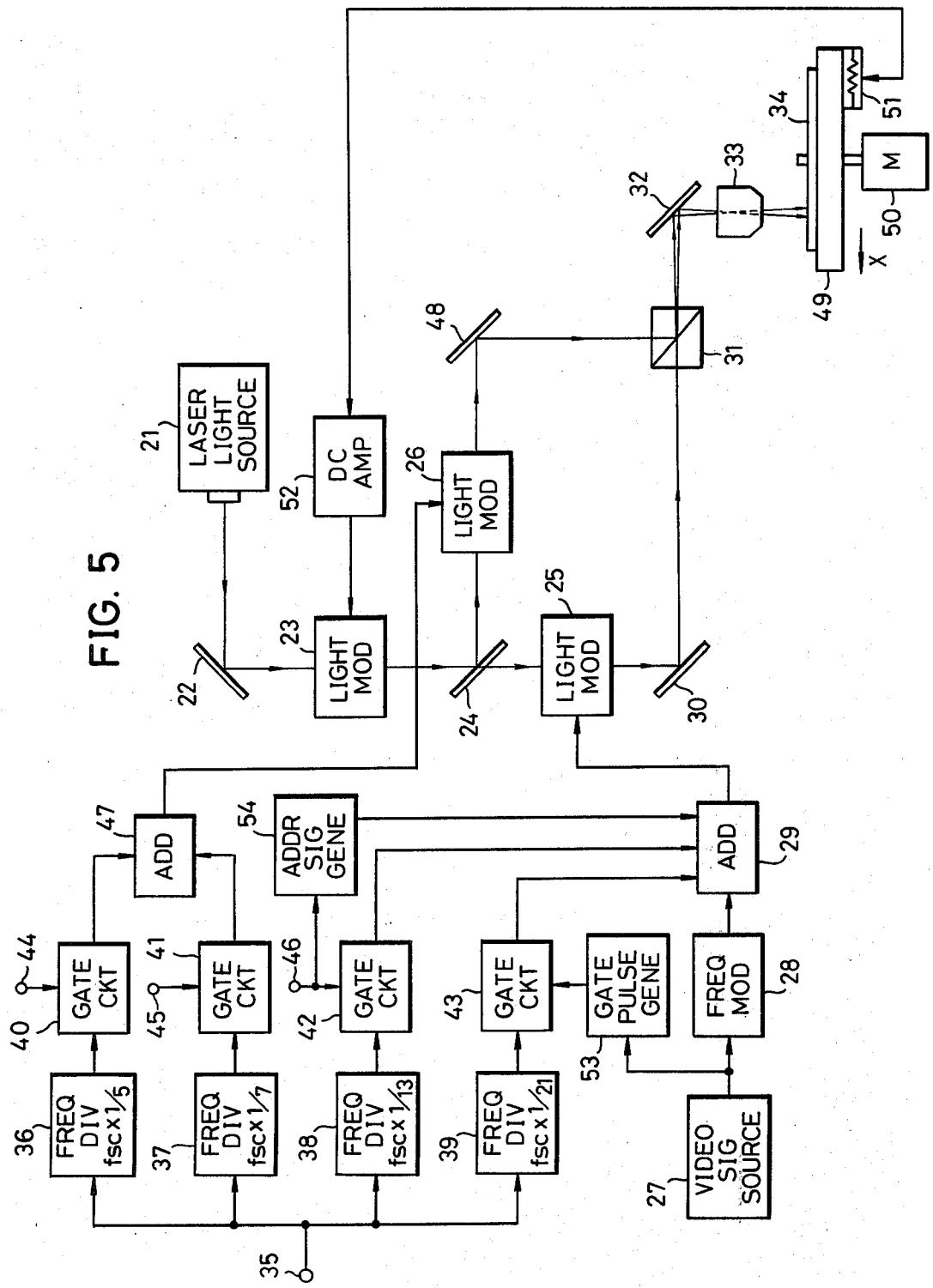
FIG. 5 is a block diagram of one embodiment of the system according to the invention for recording the video signal thus converted on a rotating recording medium.

The original disc 34 recorded by the above described recording system illustrated in FIG. 5 is devloped by a known developing process. The track pattern and an outline of the recorded positions of various signals on the rotating disc 10 (10a) thus obtained are as shown in FIG. 3 or 4 and FIG. 8. While it was not mentioned in the above described embodiment of the invention, an audio signal is also added to the video signal supplied from the signal source 27 to the frequency modulator 28. This audio signal is also recorded and reproduced as a main information signal.

Figure 9:
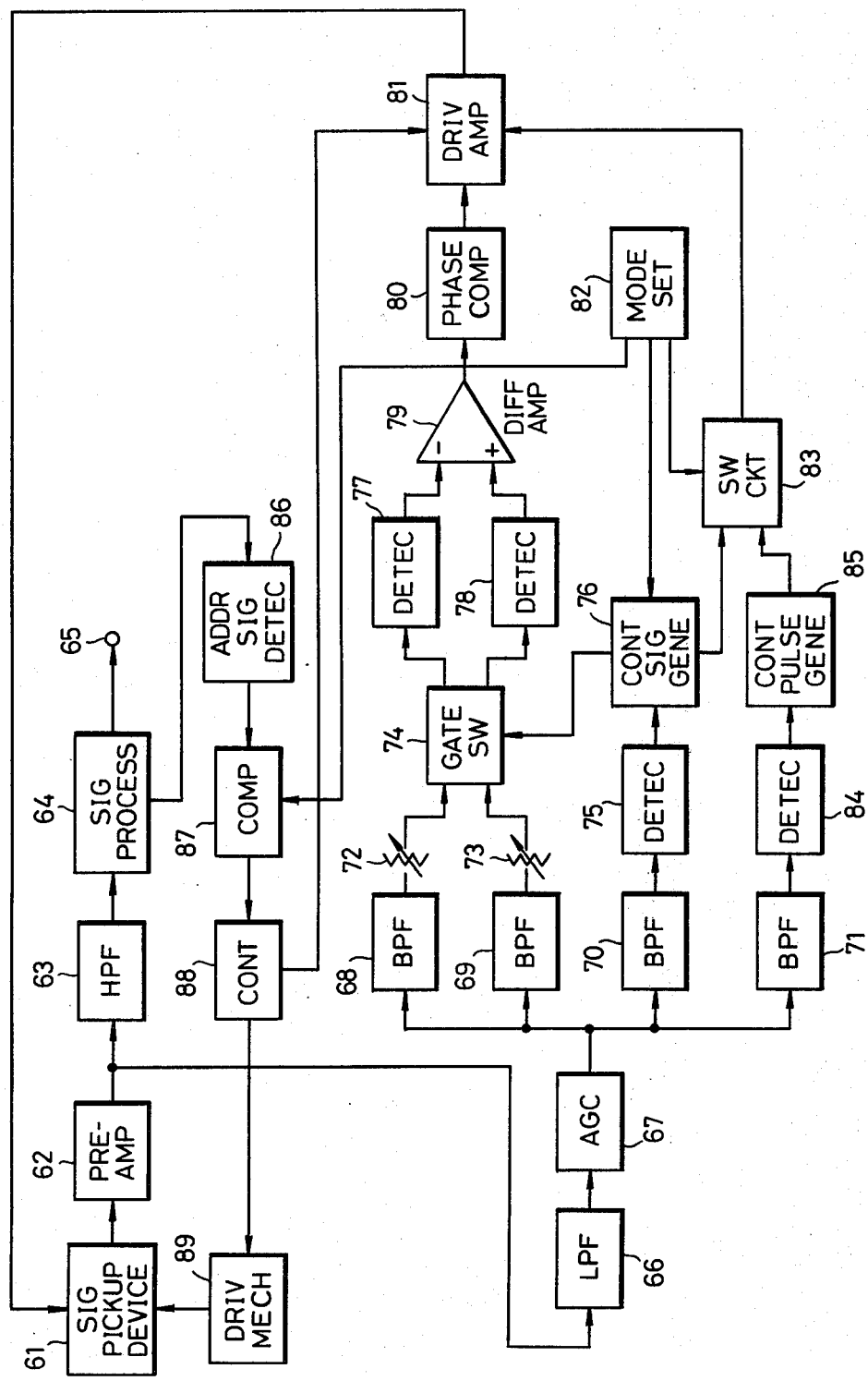
FIG. 9 is a block diagram of an embodiment of the system of the invention for reproducing the rotating recording medium recorded by the system shown in FIG. 5.

One example of a reproducing system, constituting an embodiment of the invention, for reproducing the rotating disc 34 recorded in the above described manner will now be described in conjunction with FIG. 9. A signal pickup device 61 picks up signals from the rotating disc 10 (10a). These signals are passed through a preamplifier 62 and a high-pass filter 63 and supplied to a signal processing circuit 64, in which the frequency-modulated video signal, together with the audio signal, is demodulated. The reproduced video signal and audio signal thus obtained are led out through an output terminal 65.

On the other hand, the output signal of the pre-amplifier 62 is supplied to a low-pass filter 66. The output reference signals fp1, fp2, fp3, and fp4 from the low-pass filter 66 pass through an automatic gain control circuit 67 and are supplied respectively to band-pass filters 68 through 71. The pilot signals fp1 and fp2 which are filtered through the band-pass filters 68 and 69 are respectively adjusted to have the same level by level adjusters 72 and 73, and are then supplied to a gate switching circuit 74. The pilot signal fp3 filtered through the band-pass filter 70 is supplied to a detection circuit 75, where it is rectified and filtered, and is then supplied to a control signal generating circuit 76 thereby to generate a switching pulse. The gate switching circuit 74 switches the signals fp1 and fp2 every revolution period of the disc in response to the switching pulses supplied from the control signal generating circuit 76, and supplies the switched signals fp1 and fp2 of respectively predetermined polarities to detecting circuits 77 and 78.

The detecting circuits 77 and 78 detect the envelopes of their respective input reference signals and convert the envelopes into DC voltages. These voltages are then supplied to a differential amplifier 79. This differential amplifier 79 compares the output signals of the two detecting circuits 77 and 78 which vary in response to the reproduced levels of the signals fp1 and fp2. This generates an output tracking error signal which indicates the tracking error direction and the error quantity. This error signal passes through a phase compensation circuit 80 and is further amplified to a specific level by a driving amplifier 81.

Then, the output signal of the driving amplifier 81 is applied to a tracking control means in the signal pickup device 61 as a control signal thereby to control it. As a result, the tracing stylus of the signal pickup device 61 is tracking controlled so that the above mentioned tracking error signal becomes zero, that is, so that the stylus traces correctly the track of the disc.

The control signal generating circuit 76 operates in response to the reproducing mode set by a control part 82 for setting the special reproducing mode such as slow or fast reproducing mode to generate switching pulses and skip pulses, which are respectively supplied to the gate switching circuit 74 and to the driving amplifier 81 by way of the switching circuit 83. In response to the output of the driving amplifier 81, the signal pickup device 61 is controlled so that the stylus is forced to shift the track, thus performing the slow or fast reproducing mode of operation.

On the other hand, the identification reference signal fp4 obtained by the band-pass filter 71 is rectified and detected by a detection circuit 84 and then sent to a control-pulse generator 85, thereby being made into control pulses. Then, when the mode-setting control device 82 is set for the still-picture mode of reproduction, the switching circuit 83 is changed over, and the control pulses from the control pulse generating circuit 85 are passed through the switching circuit 83 and are supplied to the driving amplifier 81. Then, since these control puses are formed on the basis of the identification reference signal fp4, the reproducing stylus of the signal pickup device 61 is controlled to transfer to the outer track turn at the position 11 or 11a shown in FIG. 3 or 4 by the output control pulses of the driving amplifier 81.

Then, in FIG. 3 for example, when the reproducing stylus has completed its tracing of the track turn $t_1$ along which the picture content of the same film frame has been recorded over a 4-field span, the above mentioned reference signal fp4 is reproduced and detected at the position 11, whereupon the above mentioned control pulses are generated. As a result, the reproducing stylus is shifted outward by one track turn and again traces and reproduces the track turn $t_1$ from its starting end. Since this operation is repeated thereafter, only the track turn $t_1$ is repeatedly traced and reproduced, and only the picture content of the first film frame is repeatedly reproduced. As a result, still-picture reproduction is accomplished wherein the picture remains perfectly still.

Similarly, when the reproducing operation is set for still-picture reproducing mode while the reproducing stylus is reproducing the track turns $t_2$ and $t_3$ of the rotating disc 10 shown in FIG. 3, the picture image content of the fifth film frame of 4 fields is reproduced over track turns $t_3$ and $t_4$. Thereafter, in response to the identification reference signal fp4 reproduced at the position 11, the reproducing stylus returns from an intermediate point of the track turn $t_4$ to an intermediate point of the track turn $t_3$. Similarly thereafter, only the picture image content of the fifth film frame of 4 fields is reproduced.

At the time of a random access mode of operation, a set address signal is supplied from the mode-setting control device 82 (FIG. 9) to a comparator 87. The output signal from the signal processing circuit 64 is fed to an address signal detection circuit 86, and the address signal Sad is detected. This detected address signal Sad is fed to the comparator 87. The comparator sends out a signal to a control circuit 88 until the two address signals supplied to the comparator 87 coincide. The control circuit 88 supplies its output to a driving mechinism 89, which thereupon moves the signal pickup device 61 rapidly to the set address position. The output of the control circuit 88 is also supplied to the driving amplifier 81, whereby control is carried out so that the reproducing stylus reaches the set address position accurately and positively.

Instead of using the above mentioned reference signal fp4 for identification, a memory device may be provided in the mode-setting control device 82 and used to store the address number corresponding to the position of the reference signal fp4. In this case, control pulses similar to those generated by the above mentioned reference signal fp4 are generated in the address number position, which has been stored as described above, by the setting of the still-picture mode of reproduction.

FIG. 10 shows one example of how the reproducing stylus of the signal pickup device 61 traces on the rotating disc. There are no guide grooves in those surface parts of a disc 11 in which pits are not formed. Pits 92 are formed in the disc 11 in accordance with the above mentioned main information signal. Only one part of the main information signal track turns $t_1$, $t_2$, and $t_3$ (FIG. 3) comprising each of successions of pits 92 is shown in FIG. 10. The tracks $t_1$, $t_2$, $t_3$, . . . are parts of a single spiral track and are respectively parts corresponding to revolutions of the disc 11. An information signal of four fields of a video signal are recorded along each track.

In the present embodiment of the invention, the pits are so formed that one of the edge lines of each track is substantially coincident with the nearest edge line of the adjacent track. That is, the adjacent tracks $t_1, t_2, t_3, \ldots$ are so formed that they are successively contiguous.

At central positions (coinciding with the edge lines of the tracks in the present embodiment of the invention) approximately intermediate between the centerlines $t_{1c}$ and $t_{2c}, t_{2c}$ and $t_{3c}, \ldots$ of the mutually adjacent tracks $t_1$ and $t_2, t_2$ and $t_3, \ldots$, pilot signal pits 93 and 94 responsively corresponding to the aforementioned pilot signals fp1 and fp2 are formed.

The third and fourth pilot signals fp3 and fp4 are recorded, with pits having width same to the width of the pits (track width) of the information signal track, at the predetermined position in the vertical blanking interval V. BLK on the respective tracks $t_1, t_2, t_3, \ldots$. Since the third and fourth reference signals fp3 and fp4 are thus recorded in a superimposition on the information signal, the signals fp3 and fp4 can be stably and accurately reproduced, even though the tracing stylus deviates a little from the center line of the track.

The bottom face 96 of the stylus has a part of maximum width, which is greater than the track pitch of the disc 11, and an electrode 97 having a thickness of 500–3000 Å is fixed to the rear face of the stylus at the rear edge of the bottom face 96. As the disc 11 rotates in the arrow direction, the tracing stylus 95 traces along the surface of the disc 11. The electrostatic capacitance varies between the electrode 97 and an electroconductive layer covering the entire surface of the disc. The capacitance varies in response to the pits 92, whereby the main information signal recorded in the form of pits 92 is reproduced.

The embodiments set forth are described for reproducing the disc recorded in a pit pattern by means of an electrostatic tracing stylus. The reproducing tracing means is not limited to the tracing stylus type, but the laser beam, for instance, may be used.

Further, this invention is not limited to these embodiments but various variations and modifications may be made without departing from the scope of the invention.

What is claimed is:

1. A recording system for converting the images on a cinematographic film of 24-frames per second into video signals of 60-fields per second without changing the apparent speed of the recorded motion, said system comprising transforming means for transforming four consecutive frames of scenes on the cinematographic film into a group of ten consecutive video signal fields by repeating a first film frame of said scenes four times to make up a first four video fields and subsequently repeating each of the remaining three film frames of said scenes two times in order to make up the rest of six video fields in the group of ten fields, gating means for generating reference signals for identifying the start and the finish of each of said repeated groups, adding means jointly responsive to said transforming means and said gating means for adding said reference signals to mark a start and finish for each of said repeated groups, each of said reference signals appearing at a specific position within a vertical blanking period of said video signal, means responsive to said adding means for recording said groups with said start and finish, means for rotating a recording medium at rotational speed of 900 r.p.m. to carry out the recording by said recording means, means for recording the output of said adding means on a spiral track on said medium at a rate of four fields for each revolution of said recording medium, so that a scene of the same film frame is recorded over a track length corresponding to one revolution of the recording medium.

2. A recording system for converting a cinematographic film of 24-frames per second into video signals of 60-fields per second without changing the apparent speed of the recorded motion, said system comprising transforming means for transforming eight consecutive film frames of scenes on the cinematographic film into a group of twenty consecutive video fields by repeating a first film frame of said scenes four times to provide the first four fields of video signals, for repeating a second and a third film frame of said scenes two times each to provide the fifth to eighth video fields, for repeating a fourth film frame of said scenes four times to provide the ninth to twelfth video fields of the group, and then for repeating the fifth, sixth, seventh, and eighth film frames of said scenes two times to provide the rest of the remaining eight video fields in the group of twenty consecutive video fields, gating means for generating reference signals for identifying the start and the finish of each of said repeated groups of twenty consecutive video fields, adding means jointly responsive to said transforming means and said gating means for adding said reference signals to mark a start and finish for each of said repeated groups of twenty consecutive video fields, each of said reference signals appearing at a specific position within a vertical blanking period of said video signal, means responsive to said adding means for recording said groups of twenty consecutive video fields with said start and finish, means for rotating a recording medium at a rotational speed of 900 r.p.m. to carry out the recording by said recording means, and means for recording the output of said adding means on a spiral track on said medium at a rate of four video fields for each revolution of said recording medium, so that a scene of the same film frame is recorded over a track length corresponding to one revolution of the recording medium.

3. A process for converting images on a motion picture film into a video signal, said film being recorded in the form of 24-frames per second and said video signal being displayed at 60-fields per second, said process comprising:
(a) repeating video signals derived from a first motion picture frame as four consecutive video fields;
(b) repeating video signals derived from each of the next three film frames two times in order to provide the next six video fields; whereby said four film frames produce a 4-2-2-2 conversion into video signals;
(c) generating reference gating signals for identifying the beginnings and ends of each 4-2-2-2 conversion;
(d) arranging each 4-2-2-2 conversion responsive to said reference signal to have a specific position relative to a vertical blanking period in said video signals; and
(e) recording four fields on each turn of a spiral track on a recording disk which is rotating at 900 r.p.m.

* * * * *